United States Patent [19]

Koyano et al.

[11] Patent Number: 4,877,636

[45] Date of Patent: Oct. 31, 1989

[54] CHOCOLATE AND CHOCOLATE ADDITIVE

[75] Inventors: Tetsuo Koyano, Kawasaki; Nobuo Sagi, Sakai; Tsugio Izumi, Sennan; Setsuya Fujita; Tadahiko Murata, both of Yokohama; Iwao Hachiya, Yokohama; Hiroyuki Mori, Sakai, all of Japan

[73] Assignees: Meiji Seika Kaisha, Ltd., Tokyo; Fuji Oil Company, Limited, Osaka, both of Japan

[21] Appl. No.: 113,762

[22] Filed: Oct. 28, 1987

[30] Foreign Application Priority Data

Nov. 11, 1986 [JP] Japan .............................. 61-269393
May 29, 1987 [JP] Japan .............................. 62-136530

[51] Int. Cl.⁴ ......................... A23D 5/00; A23G 1/00
[52] U.S. Cl. .................................. 426/607; 426/610; 426/631

[58] Field of Search ................ 426/98, 607, 660, 631, 426/610

[56] References Cited

U.S. PATENT DOCUMENTS 4,726,959  2/1988  Momura et al. .................... 426/607
4,737,369  4/1988  Asano et al. .......................... 426/98

Primary Examiner—Donald E. Czaja
Assistant Examiner—Celine T. Callahan
Attorney, Agent, or Firm—Wenderoth, Lind & Ponack

[57] ABSTRACT

A chocolate additive for preventing fat blooming and useful for omitting or simplifying the tempering operations comprising powder particles composed of as the main component a 2-unsaturated-1,3-disaturated glyceride constituent fatty acids of which are unsaturated fatty acids having at least 18 carbon atoms and saturated fatty acids having 20 to 24 carbon atoms and a chocolate containing the additive.

3 Claims, 2 Drawing Sheets

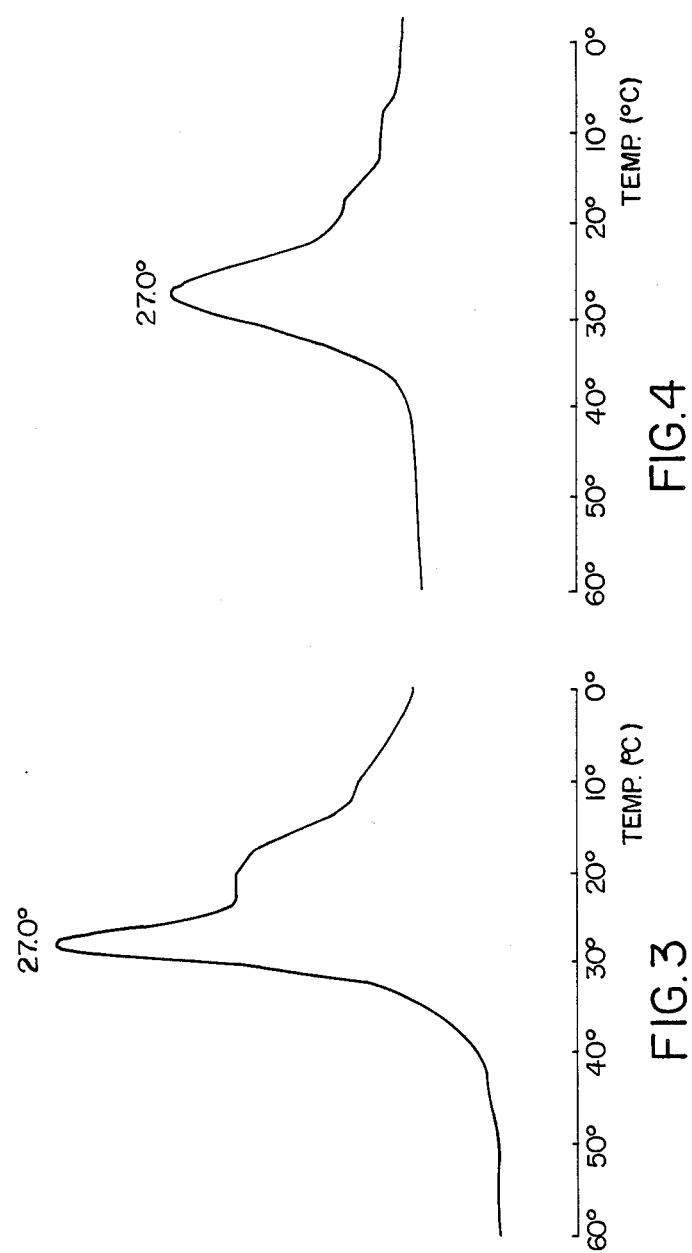

CHOCOLATE AND CHOCOLATE ADDITIVE

FIELD OF THE INVENTION

The present invention relates to a chocolate additive. Particularly, the additive of the present invention is suitable for the production of chocolate of such quality that fat bloom is prevented even after standing at a temperature such as about the body temperature at which shape retention is lost for a certain period, and is useful for omitting or simplifying the tempering operation in chocolate production. The present invention also relates to chocolate using the additive of the present invention and a process for producing the same.

The term "chocolate" used herein is not limited to specific kinds of chocolate such as those prescribed by laws and regulations, and means any kind of chocolate including chocolate and other processed food of fats and oils using a so-called cacao butter substitute or an equivalent thereof.

BACKGROUND OF THE INVENTION

In general, chocolate is produced by appropriately mixing cacao mass, cocoa, cacao butter, a cacao butter substitute, a sweetener, milk powder and the like, and subjecting the resulting chocolate mix to rolling, conching and tempering. In chocolate thus obtained, there is a problem that blooming is often caused during storage, which lowers the commercial value thereof. Blooming is divided into fat blooming caused by unstable crystals of fats and oils, and sugar blooming caused by recrystallization of sugar. Particularly, the former fat blooming is frequently caused.

Tempering is effected from the viewpoint of transformation of a crystal form of fats and oils in chocolate into a stable one to prevent fat blooming. When tempering is insufficient, fat blooming may be caused under various conditions and, in excessive cases, even release from a mold becomes difficult. Thus, tempering is an important step in chocolate production. However, even if sufficient tempering is effected, it is very difficult to prevent blooming, when chocolate is exposed to a high temperature such as about the melting point of a product at which it loses its hardness for a certain period of time (e.g., exposure to sunlight in summer).

Further, there are respective characteristic optimum conditions according to a particular formulation of fats and oils in chocolate, cooling rate and the like, and the optimum tempering conditions can not be always readily found out. For example, almost all refrigerators used for tempering have relatively little versatility, and are assembled so that they are adapted to specific cooling rates. Accordingly, the degree of tempering of chocolate should be adjusted based on a particular type of a refrigerator to be used, and it is often experienced that a particular tempering style should be preliminarily found out (M.G. Reade, The Manufacture Confectioner/January 1985).

Thus, there are various methods for tempering. However, in industrial practice, tempering usually contains at least one step for force-cooling a molten fatty composition, i.e., a molten chocolate mix, and at least one step for reheating it (e.g., cf. "Seika Jiten" page 459, October, 1981, published by Asakura Shoten). It is clear that the loss of energy becomes generally greater, when both cooling and subsequent heating are effected in a single apparatus. Therefore, it is necessary to install two kinds of apparatuses for cooling and heating (Japanese Pat. Kokai No. 61-40750).

On the other hand, there is a tendency to omit such a troublesome tempering operation if possible and, for this purpose, it has been proposed to use a hard butter having a high elaidin content, a laurin type hard butter, a hard butter wherein the fatty acid arrangement is randomized by interesterification or the like. However, when using these hard butter, a large amount of cacao butter can hardly be used and therefore there is limitation to provide a resulting chocolate product with desired taste and flavor of cacao butter.

Further, in order to prevent fat blooming, various hard butter compositions and fatty additives have been proposed.

For example, Japanese Pat. Kokoku Nos. 46-26823 and 46-26824 disclose a fat blooming inhibitor which is a fractionated oil having an iodine value of 33 to 55, a melting point of 30° to 70° C., a specific fatty acid composition and SCI characteristics obtained by interesterification of a hardened oil containing a main acid moiety of fatty acids having 20 to 24 carbon atoms such as a hardened rapeseed oil, and a hardened oil containing a main acid moiety of fatty acids having 16 to 18 carbon atoms such as a hardened tallow, or a hardened oil containing a main acid moiety of fatty acids having 12 to 14 carbon atoms such as a hardened laurin oil (e.g., palm kernel oil); and fractionation of the resulting product. Japanese Pat. Kokoku No. 47-16926 discloses a process for production of chocolate using a similar fractionated oil to prevent fat blooming. Japanese Pat. Kokai No. 58-198245 discloses a fat blooming inhibitor which is a fat containing as the main acid moiety 20 to 60% by weight of behenic acid. Japanese Pat. Kokoku No. 60-24749 discloses a process for producing a trans-acid type hard butter having a specific fatty acid composition consisting of elaidic acid, palmitic acid, behenic acid and other fatty acids, wherein the fatty acid residues are randomly distributed. European Pat. Application Publication No. 0196780 (A2) discloses a fat blooming inhibitor which is a mixed acid triglyceride having as the main acid moiety 15 to 70% by weight of saturated fatty acids having 20 to 24 carbon atoms and 20 to 60% by weight of unsaturated fatty acids having 16 to 22 carbon atoms. European Pat. Application Publication No. 0227364 (A2) discloses a hard butter composition having antiblooming property which comprises as a main ingredient a $\beta$- unsaturated- $\alpha,\alpha'$- disaturated triglyceride, constituent saturated fatty acids of which contain at least 4% by weight of one or plurality of fatty acids selected from the group consisting of behenic acid, lignoceric acid, cerotic acid and arachidic acid, provided that the amount of arachidic acid is less than 4% by weight based on the total weight of the constituent saturated fatty acids.

OBJECTS OF THE INVENTION

The present invention relates to an improvement of the above conventional technique for preventing fat blooming in chocolate.

That is, one object of the present invention is to provide chocolate having resistance to high temperatures which has not been obtained even by effecting proper tempering according to conventional chocolate production. That is, the present invention provides chocolate in which fat blooming can be prevented even after permitting it to stand it at a high temperature such as about body temperature for a certain period of time. In other words, the chocolate of the present invention can return to the original glossy state by itself, even after such standing.

Another object of the present invention is to provide a process for producing chocolate which has a sufficiently desired taste and the flavor of cacao butter, while omitting or simplifying the tempering step. Thereby, the process of the present invention is very advantageous from the viewpoint of decreasing the process steps as well as from the viewpoint of such energy and simplifying the apparatus.

Still another object of the present invention is to provide a chocolate additive which is useful for attaining the above objects of the present invention.

These objects and advantages as well as other objects and advantages of the present invention will become apparent to those skilled in the art from the following description with reference to the accompanying drawings.

BRIEF EXPLANATION OF DRAWINGS

FIGS. 1 to 4 are differential scanning calorimeter (DSC) charts of chocolates obtained in Example 7, and Comparative Examples 1, 6 and 7 hereinafter, respectively.

SUMMARY OF THE INVENTION

Figure 2:
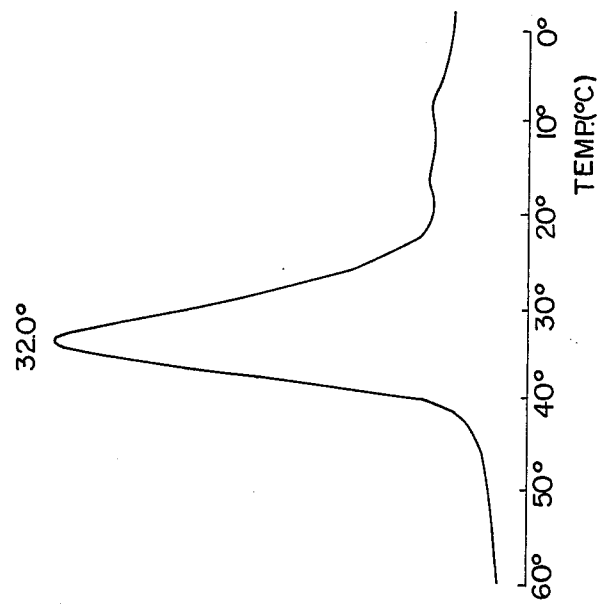

In order to effectively prevent fat blooming in chocolate, the present inventors have studied intensively. As a result, it has been found that fat blooming can be prevented by admixing a pulverized fat having a specific glyceride composition without melting into the chocolate mix, and a chocolate product which can return to the original glossy state even after standing at a high temperature can be obtained. Further, it has been also found that the pulverized fat is effective as an additive which is useful for omitting or simplifying the tempering step.

That is, according to the present invention, there are provided, (a) a chocolate additive comprising powder particles composed of as the main component a 2-unsaturated-1,3-disaturated glyceride constituent fatty acids of which are unsaturated fatty acids having at least 18 carbon atoms and saturated fatty acids having 20 to 24 carbon atoms;

(b) chocolate which comprises a chocolate mix and particles of a 2-unsaturated-1,3-disaturated glyceride constituent fatty acids of which are unsaturated fatty acids having at least 18 carbon atoms and saturated fatty acids having 20 to 24 carbon atoms; and (c) a process for producing chocolate which comprises admixing powder particles of a 2-unsaturated-1,3-disaturated glyceride constituent fatty acids of which are unsaturated fatty acids having at least 18 carbon atoms and saturated fatty acids having 20 to 24 carbon atoms into a chocolate mix with preventing melting of the particles.

By admixing the chocolate additive of the present invention into a chocolate mix, fat blooming is effectively prevented during storage of a resulting chocolate product even at a temperature such as about the body temperature at which the chocolate product itself is molten. Thus, the present invention is particularly useful in summer and also useful for chocolate manufacturers and sellers in the tropical zone. By using the chocolate additive of the present invention, reheating in a tempering step can be omitted and further, even if the step is omitted or simplified, a chocolate product can be readily released from a mold or quickly "dried" (solidified). Thereby, enrobing can be made at an early stage and a product having good properties such as excellent gloss, luster, mouth feel and the like can be readily obtained. As opposed to the conventional non-tempering type hard butter, a product having desired taste and flavor of cacao butter can be readily obtained by the above omission or simplification of the tempering step. Furthermore, since the tempering manner can be readily standardized in comparison with a conventional tempering, the range necessary to preliminary study in a particular tempering style can be limited and this is very convenient from the practical viewpoint.

DETAILED DESCRIPTION OF THE INVENTION

The chocolate additive of the present invention comprising powdery particles composed of as the main component a 2-unsaturated-1,3-disaturated glyceride constituent fatty acids of which are unsaturated fatty acids having at least 18 carbon atoms and saturated fatty acids having 20 to 24 carbon atoms.

A fat or oil composition composed of as the main component a 2-unsaturated-1,3-disaturated glyceride can be produced by using enzymatic selective interesterification disclosed in, for example, Japanese Pat. Kokai Nos. 52-104506, 55-71797, 55-84397, 56-127094 or 60-251891. That is, fatty acids mainly containing saturated fatty acids having 20 to 24 carbon atoms (e.g., arachidic acid, behenic acid, lignoceric acid and the like; particularly, behenic acid is readily available) can be obtained by hardening, suitable fats and oils, for example, rapeseed oil, radish oil, Lunaria oil, fish oil, whale oil and the like, and decomposing and fractionating them. The desired glyceride can be obtained by subjecting these saturated fatty acids or esters thereof to interesterification with a fat or oil the constituent fatty acids at 2-position of which are mainly composed of unsaturated fatty acids having at least 18 carbon atoms (mainly oleic acid: a small amount of linoleic acid, arachidonic acid, erucin acid and the like may be contained) to selectively attach the saturated fatty acids to 1- and 3-positions of the fat or oil. The term "main component" means that of powder particles and does not necessarily mean that of "the chocolate additive" because which may contain a "dispersion medium" as described hereinafter. Preferably, the particles contain at least about 50% by weight, more preferably, at least 70% by weight of the glyceride, and the additive contains, preferably at least 20% by weight, more preferably at least 40% by weight of the particles.

When the constituent saturated fatty acids of 2-unsaturated-1,3-disaturated glyceride contain carbon atoms less than that described above, or the glyceride is not the main component in the powder particles, the particles can not maintain their crystalline state having a high melting point in a chocolate product or a chocolate mix which has reached to a high temperature such as at the body temperature, and the desired effect of the present invention can hardly be expected. Further, when the glyceride to be used is a triglyceride the constituent fatty acids at 2-position of which are also saturated fatty acids, i.e., a trisaturated triglyceride which is readily obtained from a highest degree hardened oil, is used instead of 2- unsaturated-1,3-saturated glyceride, good crystal growth can not be accelerated and, for example, it is difficult to release a chocolate mix subjected to tempering from a mold after cooling and, even if the mix can be released, its gloss is inferior. Furthermore, when the glyceride is an isomer glyceride, i.e., 1,2- or 2,3-disaturated-3- or 1unsaturated glyceride, good crystal growth can not be accelerated, either. And, the fat composed of as the main component the above specific glyceride should be in the form of powder particles. If it is in the form of liquid, a characteristic peak derived from the glyceride in DSC chart is disappeared as described hereinafter, and it is difficult to release a product from a mold, unless a conventional tempering is effected. Further, even in the case that a product containing such a liquid glyceride is used in enrobing, fat blooming is immediately caused. Furthermore, when a chocolate product containing such a liquid glyceride is exposed to a high temperature at which shape retention is lost, it no longer return to the original glossy state even after the temperature is dropped.

Preferably, the above powder particles are in the form of stable crystals. The term "stable crystals" used herein means a crystal form showing at least 4 peaks of a short lattice spacing (side lattice spacing) in a X-ray diffraction spectrum. That is, the crystal form is preferably, IV or more stable form, more preferably, V or more stable form of the cacao butter crystal forms designated by R. L. Wille and E. S. Lutton [J.A.O.C.S., 43, 491-496(1966)]. If the above powder particles are not stable crystals, improvement of tempering effect is scarcely expected.

The stable crystal form can be obtained by aging the triglyceride at a temperature lower than about its melting point (particularly, the melting point of its stable crystal form) for a certain period of time. This aging period can be shortened by using the triglyceride fat in the form of a finely divided state, for example, powder. Further, in general, crystals obtained by forming micelle of a triglyceride with a solvent (e.g., an organic solvent such as hexane, acetone, etc., a supercriticl gas) and depositing therefrom are stable even without aging and therefore such crystals can be used as the stable crystals by removing the solvent from the deposited crystals with preventing melting the crystals (e.g., removal of a solvent under vacuum).

The powder particles can be formed by, for example, spraying a desired molten fat from a spray dryer at a certain temperature, or pulverizing a solid fat in the form of masses or coarse particles alone or together with a dispersion medium described hereinafter (e.g., placing a part of cacao butter in a homogenizer, adjusting the temperature at not higher than 30° C., adding thereto small masses and pulverizing the mixture). Further, pulverization can be carried out by utilizing ultrasonic wave. However, in the case that a solid fat has been already in the form of stable crystals, it is preferred to carry out pulverization under low temperature atmosphere at which crystals are not molten, for example, by cooling with dry-ice or so-called freeze pulverization.

The average particle size of the powder particles is not more than 500 $\mu$, preferably not more than 100 $\mu$, more preferably not more than 25 $\mu$. When the particle size is too large, fat blooming can not be effectively prevented because of decrease in the number of nuclei which accelerates crystallization, or dispersion in a chocolate mix becomes inferior and, in some cases, the particles adversely affect on mouth feel and impair edible properties of a product. When the particle size is small, an amount to be used may be decreased. However, attention should be given so as to prevent particles from melting due to a high temperature at addition thereof to the mix as described hereinafter.

As described above, the chocolate additive of the present invention can contain a dispersion medium to improve dispersibility and, when dispersibility is improved, effect of addition of the additive is further enhanced. When a non-oily material is used as the dispersion medium (e.g., saccharides), there is an additional effect such as it prevents agglomeration of the above powder particles of the glyceride during storage of the additive. The dispersion medium is preferably powder selected from one or more ingredients of a chocolate mix such as saccharides, milk powder, cacao mass, cocoa powder, cacao butter, hard butter, surfactants and the like. Since, usually, the additive is not passed through a refiner after addition thereof to a chocolate mix, the particle size of the dispersion medium is preferably not more than 50 $\mu$ so as to prevent impairment of mouth feel of a product. Further, in the case that the dispersion medium itself contains a fat or oil and is used in a relatively larger amount with omitting or simplifying a tempering step, the fat or oil is preferably also in the form of stable crystals.

In general, the chocolate additive can contain up to 80 % by weight of the dispersion additive.

Another aspect of the present invention is the use of the above chocolate additive. That is, this aspect is a process for producing chocolate which comprises addition of the powder particles which is the effective ingredient of the additive to a chocolate mix with preventing melting of the particles. Further, still another aspect of the present invention is chocolate containing particles of a 2-unsaturated-1,3-disaturated glyceride constituent fatty acids of which are unsaturated fatty acids having at least 18 carbon atoms and saturated fatty acids having 20 to 24 carbon atoms.

In the process of the present invention, the chocolate mix are preferably a molten mix which has been already treated by subjecting it to conching and the like. The mix itself is not limited to specific compositions and it may be a conventional mixture of, for example, suitable amounts of cacao mass, cocoa, cacao butter, sweeteners, milk powder, other fatty compositions, surfactants and the like. When the additive is added to a chocolate mix before treatment, the powder particles are liable to form an eutectic mixture with other glycerides at the temperature of conching. Thus, preferably, addition of the powder particles is made during solidification with cooling of the chocolate mix and therefore it is preferred to make this addition at a temperature lower than that at which all the ingredients of a chocolate mix are in a fully molten state, preferably 39° C. of lower. In this manner, reheating which is almost always required in a conventional tempering step is not required and thereby it is possible to omit such operation and its apparatus. Further, immediately after dispersion of the particles in a chocolate mix, it is possible to cast the resulting chocolate material or to use it in enrobing. Therefore, a temperature at which the particles are added is higher, a tempering step can be more simplified and, in fact, a tempering can be omitted. However, a conventional tempering may be effected in the present invention and it is possible to add the chocolate additive of the present invention, unless a chocolate mix loses fluidity.

Usually, the chocolate additive of the present invention can be added to a chocolate mix in an amount of 0.1 to 10% by weight in terms of the weight of the powder particles based on the total amount of the resulting chocolate product. When the particles are dispersed well, the desired effect can be obtained in an amount of about 2% by weight of the additive and any larger amount is not required. When the amount of the additive is too small, the desired effect can hardly be expected and, when the amount is too large, melting in the mouth becomes inferior.

The present invention is mainly directed to tempering type chocolate, i.e., that using so-called tempering type fats and oils such as cacao butter and other fats and oils rich in SUS ingredient (2-unsaturated-1,3-disaturated glyceride) such as shea fat, palm oil, sal fat, mango kernel oil, kokum fat, illipe butter, their fractionated oils and the like. However, the present invention can be also applicable to non-tempering type chocolate wherein trans-acid type fats and oils are used.

By the way, after addition and dispersion of the chocolate additive of the present invention in a chocolate mix, the resulting chocolate product can be treated according to a conventional manner such as depositing, casting or enrobing. In this regard, according to the present invention, severe temperature control of a hopper, a piston and a cylinder of a depositor as well as a tempering mold which requires in a conventional chocolate production is not required and, in many cases, no subsequent aging step (1 to 5 weeks) and no apparatus for this purpose are required.

In addition, the chocolate additive of the present invention can be effectively used in such a manner that it is coated on a surface of a chocolate confectionary.

The chocolate product thus obtained contains particles a 2-unsaturated-1,3-disaturated glyceride constituent fatty acids of which are unsaturated fatty acids having at least 18 carbon atoms and saturated fatty acids having 20 to 24 carbon atoms. This is confirmed by, for example, DSC analysis. The attached drawings are DSC charts obtained by collecting a sample chocolate (30 to 40 mg) in an aluminum sample pan and setting it in a DSC sample chamber together with a control pan containing no sample, quickly freezing the chamber to $-40°$ C. with dry-ice, and then electrically measuring absorbed calorie with a rise in temperature at a rate of $5°$ C./min. The difference between the case that the particles are used with preventing it from melting and that the particles are molten is clearly shown by the fact whether peak at about $50°$ C. is present or not.

The following Examples, Comparative Examples and Reference Examples further illustrate the present invention in detail but are not to be construed to limit the scope thereof. In the Examples, Comparative Examples and Reference Examples, all "parts" and "%'s" are by weight unless otherwise stated.

EXAMPLE 1 and COMPARATIVE EXAMPLES 1 and 2

Fatty acid ethyl esters were obtained by hydrolyzing a highest degree hardened oil of high erucin rapeseed oil containing 45% of unsaturated fatty acids having 22 carbon atoms and esterifying the resultant. The fatty acid esters were fractionated to obtain a fraction containing 97.9% of saturated fatty acid esters containing 20 to 24 carbon atoms. The fractionated fatty acid esters (70 parts) were mixed with high oleic acid sunflower oil (30 parts) and the mixture was subjected to interesterification by using an enzyme having selectivity to 1,3-positions to obtain an oil having the iodine value of 45. This oil was further fractionated with a solvent to obtain a high melting point fraction in the yield of 57.6%.

This fraction had the following fatty acid composition and the iodine value of 31.6, and contained 76% of 2-unsaturated-1,3-disaturated glyceride and 71.2% of 2-unsaturated-1,3-disaturated glyceride the constituent fatty acids of which were unsaturated fatty acids having at least 18 carbon atoms and saturated fatty acids having 20 to 24 carbon atoms.

Fatty acid composition

| Fatty acid composition | | | | | | | |
|---|---|---|---|---|---|---|---|
| Chain length: double bond | 16:0 | 18:0 | 18:1 | 18:2 | 20:0 | 22:0 | 24:0 |
| % | 0.7 | 1.7 | 31.6 | 2.5 | 4.8 | 56.7 | 2.0 |

The resulting fat was stabilized by tempering at $25°$ C. for 2 days and at $48°$ C. for 23 hours [corresponding to VI form designated by the above R. L. Wille and E. S. Lutton as shown by identification of X-ray diffraction (Cu-K$\alpha\lambda$=1.542)]. The fat (1.5 parts) and cacao butter (6 parts) were placed in a homogenizer and pulverized at 29 to $29.5°$ C. for 5 minutes to obtain the desired chocolate additive.

On the other hand, a chocolate mix of cacao mass (20 parts), powdered sugar (45 parts), whole milk powder (20 parts), cacao butter (7 parts) and lecithin (0.5 parts) was treated according to a conventional manner by refining, conching and tempering. Then, the above prepared additive was admixed with the resulting chocolate mix and the resulting mixture was cast in a mold, cooled, released from the mold and aged at $20°$ C. for 7 days.

The resulting chocolate product was allowed to stand at $18°$ C. for 12 hours and then at $35°$ C. for 12 hours. Although this cycle of a standing test was repeated 10 times, no fat blooming was observed. Likewise, a standing test at $18°$ C. and $37°$ C. was repeated more than 6 times but no fat blooming was observed.

For comparison, the same procedure as described above was repeated except that the above pulverized mixture of the solid fat and cacao butter was molten and admixed with the chocolate mix to obtain a chocolate product. When the above standing test at $18°$ C. and $35°$ C. of this chocolate was repeated 4 times, fat blooming was observed. In the case of the standing test at $18°$ C. and $37°$ C., fat blooming was observed at the first cycle (Comparative Example 1). By the way, chocolate produced according to the same manner by using only cacao butter, remarkable fat blooming was observed at the first cycle of each standing test (Comparative Example 2).

EXAMPLE 2 AND COMPARATIVE EXAMPLE 3

A chocolate mix of powdered sugar (44 parts), whole milk powder (29.3 parts), cacao butter (26 parts) and lecithin (0.5 part) was treated according to a conventional manner by refining, conching and tempering.

The mixture of the solid fat and cacao butter as in Example 1 was pulverized with cooling by dry-ice to obtain a desired chocolate additive.

This additive (0.2 part) was admixed to the above chocolate mix and the mixture was worked up as described in Example 1 to obtain a white chocolate product. The chocolate product was subjected to the standing test as described above. However, no fat blooming was observed.

In contrast with this, a similar chocolate product in which the above additive was not added showed remarkable fat blooming at the first cycle of each standing test (Comparative Example 3).

EXAMPLE 3

Behenic acid ethyl ester and high oleic sunflower oil were subjected to selective interesterification of 1,3-positions of glycerides by using lipase and the resulting interesterified oil was fractionated and concentrated by using a solvent. The fat thus obtained was recrystallized from hexane and the solvent was removed with preventing melting by a vacuum pump. The fat was pulverized with cooling by dry-ice in a mixer and passed through a screen to obtain a desired chocolate additive of the present invention having a particle size of 42 to 60 mesh pass (350 to 250 μ).

The crystal form of this additive was corresponding to the above VI form.

HPLC analysis showed 0.2% of AOS, 2.8% of BOS, 2.5% of BLB, 14.0% of BOA, 75.9% of BOB, 4.3% of BOLi and 0.4% of other glycerides wherein A is arachidic acid residue, 0 is oleic acid residue, B is behenic acid residue, L is linoleic acid residue and Li is lignoceric acid residue.

EXAMPLE 4

After removal of the solvent with a vacuum pump, the same fat as obtained in Example 3 was frozen in liquid nitrogen and pulverized to obtain a desired chocolate additive having the average particle size of 15.6 μ.

EXAMPLE 5

The additive of Example 3 was admixed with powder sugar in the weight ratio of 1 : 1. The mixture was frozen in liquid nitrogen and pulverized to obtain a desired chocolate additive having the average particle size of not more than 20 μ.

REFERENCE EXAMPLES 1 and 2

A high melting point fraction was obtained from Allanblackia extracted oil in the yield of 59.1%. Then, the fraction was aged for a long period of time, frozen in liquid nitrogen and pulverized to obtain an additive in the form of powder of stable crystals (corresponding to the above V form) having the average particle size of 11.4 μ(Reference Example 1). Likewise, a highest degree hardened oil of high erucin rapeseed oil containing unsaturated fatty acids having 22 carbon atoms was pulverized to obtain an additive (corresponding to a mixture of the above IV and V forms) (Reference Example 2).

The physical properties, the fatty acid composition and the melting point (A powder sample of the fat was placed about 5 mm in length in a glass capillary having an inner diameter of about 1 mm one end of which was sealed and the capillary was attached to the bulb part of a thermometer so that the sealed part was directed to downward. The melting point was measured on a water bath with a rise in temperature.) of each of fats obtained in Examples 3 to 5 and Reference Examples 1 and 2 are shown in Table 1.

TABLE 1

|  | Ex. 3-5 | Ref. Ex. 1 | Ref. Ex. 2 |
| --- | --- | --- | --- |
| Physical properties |  |  |  |
| Iodine value | 25.6 | 29.9 | 0.1 |

TABLE 1-continued

|  | Ex. 3-5 | Ref. Ex. 1 | Ref. Ex. 2 |
| --- | --- | --- | --- |
| Acid value | 0.11 | 0.35 | 0.08 |
| Fatty acid composition |  |  |  |
| C 16:0 | 0.1 | 0.6 | 3.6 |
| C 18:0 | 0.8 | 64.1 | 39.6 |
| C 18:1 | 27.9 | 35.2 | — |
| C 18:2 | 1.1 | — | — |
| C 20:0 | 5.9 | 0.1 | 10.2 |
| C 22:0 | 61.5 | — | 45.4 |
| C 24:0 | 2.5 | — | 1.2 |
| Melting point (°C.) |  |  |  |
| Beginning of melting | 51.4 | 42.4 | 71.4 |
| Completion of melting | 52.8 | 43.6 | 72.8 |

Examples 6 and 7 Comparative Examples 4 to 7

Chocolate was produced by using the additive (powder particles) of Example 3 or 4. That is, a molten chocolate mix of the following formulation was prepared according to a conventional manner by mixing the ingredients and refining and conching the mixture. The mix was cooled to 30° C. and 5% of the above powder particles based on the fat content of the mix (1.67% based on the mix) was added thereto with stirring and dispersed. Then, without reheating, the mixture was cast in a mold and solidified by standing at 15° C. for 30 minutes.

| Formulation of chocolate |  |
| --- | --- |
| Powdered sugar | 44.5% |
| Whole milk powder | 22.2% |
| Cacao butter | 19.8% |
| Cacao mass | 13.5% |
| Lecithin | 0.5 part/100 parts of these ingredients |

The resulting chocolate product was readily released from the mold and was subjected to the above standing cycle test at 18° C. and 37° C. immediately after removal from the mold. Even the test was repeated 5 times, the chocolate returned to the original glossy state at 18° C., while it lost shape retention at 37° C. By the way, due to the particle size, the chocolate product of Example 6 obtained by using the additive of Example 3 showed somewhat inferior mouth feel, while the chocolate product of Example 7 was in excellent quality.

For comparison, according to the same manner as described above, chocolate products were produced except that the additives of Reference Examples 1 and 2 were used instead of those of Examples 3 and 4 (Comparative Examples 4 and 5); no additive was added and the chocolate mix obtained after conching was directly cast in a mold (Comparative Example 6); or the additive of Example 4 was added to the mix before refining to melt the additive (Comparative Example 7).

Releasability and gloss of each chocolate product are shown in Table 2.

TABLE 2

| Additive | Melting of additive |  | releasability* and gloss |
| --- | --- | --- | --- |
| Ex. 3 | not molten | (Ex. 6) | A |
| Ex. 4 | not molten | (Ex. 7) | A |
| Ref. Ex. 1 | not molten | (Comp. Ex. 4) | A |
| Ref. Ex. 2 | not molten | (Comp. Ex. 5) | C |
| no additive | — | (Comp. Ex. 6) | C |

TABLE 2-continued

| Additive | Melting of additive | releasability* and gloss |
|---|---|---|
| Ex. 4 | molten (Comp. Ex. 7) | C |

Figure 1:
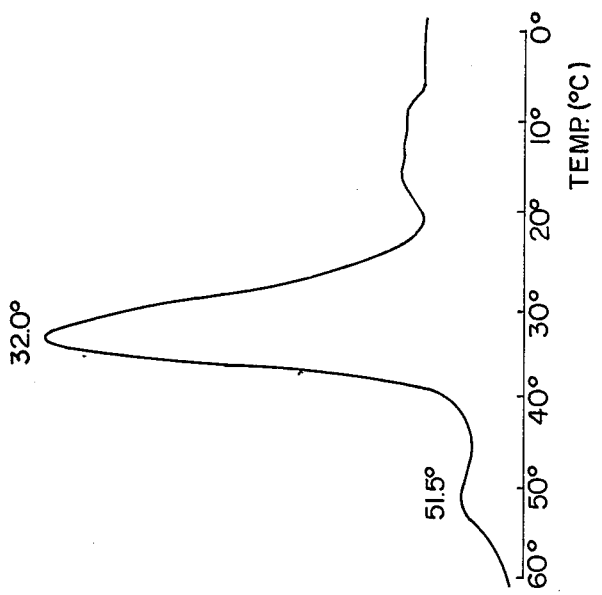

[Note]
*A: readily released with one or two tapping and good gloss
B: released with 3 to 4 tapping but partially present a stripe pattern on the surface
C: difficult to release even with tapping FIGS. 1 to 4 are DSC charts of the chocolate products of Example 7 and Comparative Examples 1, 6 and 7. As seen from FIGS. 1 and 4, the peak at about 50° C. in the chocolate of Comparative Example 7 is disappeared, although the formulation thereof is substantially the same as that of Example 1. That is, in the chocolate of Comparative Example 7, the peak corresponding to crystalline particles of a 2-unsaturated-1,3-disaturated glyceride constituent fatty acids of which are unsaturated fatty acids having at least 18 carbon atoms and saturated fatty acids having 20 to 24 carbon atoms is disappeared.

EXAMPLE 8 and COMPARTIVE EXAMPLE 8

According to the same manner as described in Example 6, chocolate products were produced except that additives of Example 4 and Reference Example 1 were used and the temperature at which the additives were added was adjusted to 36° C. The results are as shown in Table 3.

TABLE 3

| Additive | Releasability and gloss* |
|---|---|
| Example 4 (Example 8) | A |
| Reference Example 1 (Comparative Example 8) | C |

[Note]
*The same as described in Table 2

That is, although the additive of Example 4 shows tempering omission effect even at 36° C., the additive of Reference Example 1 shows such an effect only at 30° C. (see Comparative Example 4).

EXAMPLE 9

According to the same manner as described in Example 6, a chocolate product was produced except that the chocolate additive of Example 5 was used. The resulting chocolate product showed good releasability and gloss.

EXAMPLE 10

According to the same manner as described in Example 6, a chocolate product was produced except that the following formulation was employed and the chocolate additive of Example 4 was used.

| Formulation of chocolate | |
|---|---|
| Powdered sugar | 41.0% |
| Whole milk powder | 9.0% |
| Skim milk powder | 5.0% |
| Cacao butter | 35.0% |
| Cacao mass | 8.0% |
| Cocoa powder | 2.0% |
| Lecithin | 0.5 part/100 parts of these ingredients |

When a cake was enrobed with the resulting chocolate product and cooled, the product was quickly dried and give good gloss, showing good tempering accelerating effect.

On the other hand, when the chocolate additive was molten and admixed with the chocolate mix, fat blooming was caused immediately after cooling.

What is claimed is:

1. A chocolate additive for preventing fat blooming and useful for omitting or simplifying the tempering operation comprising powder particles composed of at least 50% by weight of 2-unsaturated-1,3-disaturated glyceride constituent fatty acids of which are unsaturated fatty acids having at least 18 carbon atoms and saturated fatty acids having 20 to 24 carbon atoms, said particles being in a stable crystal form of at least the V form of the glyceride and having an average particle size of not more than 500 $\mu$, and wherein said additive is to be used for addition during solidification of chocolate with cooling in chocolate production.

2. A chocolate additive according to claim 1, wherein the additive contains at most 80% by weight of a dispersion medium which is a powder selected from the group consisting of saccharides, milk powder, cocoa mass, cocoa powder, cocoa butter, hard butter and surfactants.

3. Chocolate which comprises a chocolate mix and 0.1 to 10% by weight of particles composed of at least 50% by weight of 2-unsaturated-1,3-disaturated glyceride constituent fatty acids of which are unsaturated fatty acids having at least 18 carbon atoms and saturated fatty acids having 20 to 24 carbon atoms, said particles being in a stable crystal form of at least the V form of the glyceride and having an average particle size of not more than 500 $\mu$, and whereas said chocolate is able to return to an original glossy state, even after standing at 37° C. for preventing fat blooming and useful for omitting or simplifying the tempering operations

* * * * *